Nov. 10, 1931.     J. HOPKINSON     1,830,942
WEIGHING SCALES
Filed Feb. 18, 1926     2 Sheets-Sheet 1

INVENTOR
Joseph Hopkinson
BY Cooper, Kerr &
Dunham
his ATTORNEYS

Nov. 10, 1931.   J. HOPKINSON   1,830,942
WEIGHING SCALES
Filed Feb. 18, 1926   2 Sheets-Sheet 2
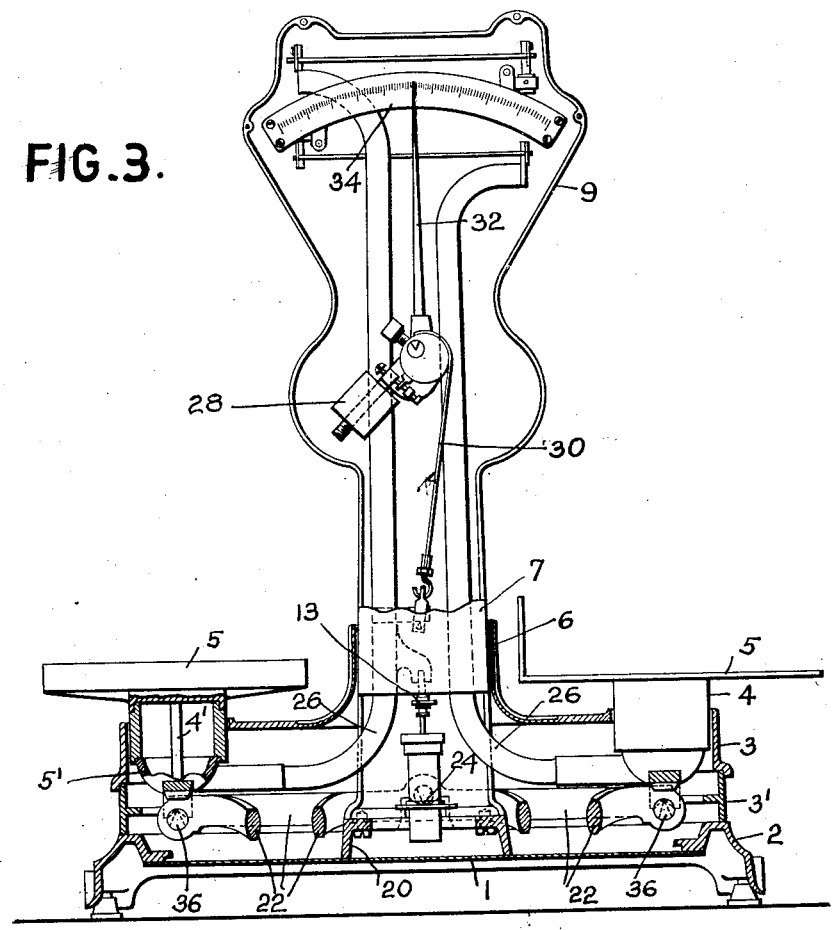
FIG. 3.
FIG. 4.
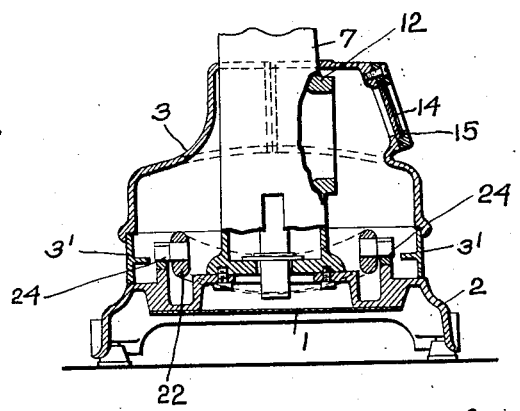
Inventor
Joseph Hopkinson
By his Attorneys
Cooper, Kerr & Dunham Patented Nov. 10, 1931

1,830,942

UNITED STATES PATENT OFFICE

JOSEPH HOPKINSON, OF DAYTON, OHIO, ASSIGNOR TO DAYTON SCALE COMPANY, OF DAYTON, OHIO, A CORPORATION OF NEW JERSEY

WEIGHING SCALES

Application filed February 18, 1926, Serial No. 88,989, and in Great Britain November 20, 1925.

This invention relates to weighing scales.

According to the present invention means are provided for converting an exposed scale into an enclosed one the scales being operative in either condition.

The invention has particular reference to scales of the kind having an exposed lever system and exposed platform or pan, stabilizing elements (check arms) and a column or standard for the automatic load counterbalancing and indicating mechanism, such as is disclosed and illustrated in U. S. Patent No. 817,777.

The invention may be applied to a scale of the kind illustrated in the above mentioned patent in such a manner as to enclose the balance lever and exposed portions of the check arms thus preventing dirt of any kind from obtaining access to them and also preventing anyone from disturbing the accuracy of the indications by tampering with or handling them.

In order that the invention may be readily understood and easily carried into effect the same will now be more fully described with reference to the accompanying drawings, which illustrate by way of example the application of the invention to a scale of the particular kind above mentioned.

In the accompanying drawings,

Fig. 3 is a partly sectional side elevation on a larger scale showing how the invention is applied to a scale of the particular kind mentioned.

Fig. 4 is a part transverse central sectional diagrammatic view of the scale, the column or standard and balance lever or levers not being shown in detail inasmuch as these parts are of usual construction.

Figure 1:
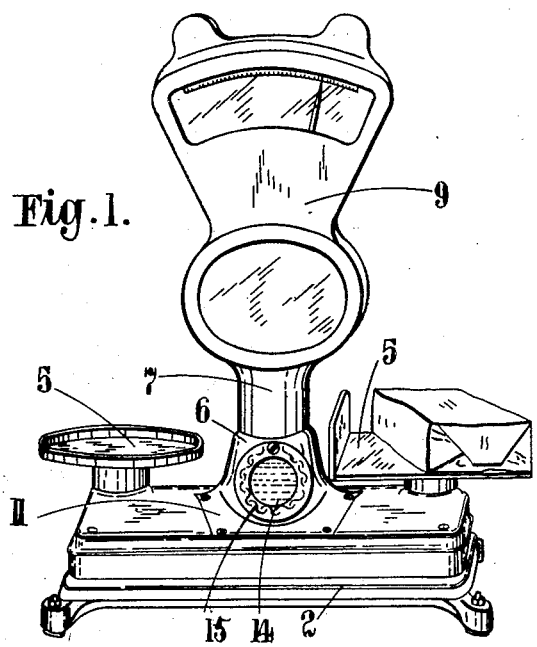
Fig. 1 is a perspective view of a converted scale embodying the invention.

Referring more particularly to the accompanying drawings the preferred means for converting such a scale may comprise a cover device such as a plate 1 adapted for attachment by screws, for example, to the frame or base 2 of the machine beneath the parts concerned, a casing or lid 3 of appropriate form to enclose the exposed parts without interfering with their action, and spacing means preferably in the form of collars 4 to support the platforms 5 in a raised position in which they will be clear of the casing 3. These collars as illustrated in Fig. 3 are formed with shoulders 4a at each end to cooperate with the shoulders on the bottom of the pans and on the normal pan supporting elements 5' to facilitate centralizing the pans 5 when fitting the same. Normally the pans are held on the pan supporting elements by vertical screws but when spacing collars 4 are used the screws must be of adequate length and the stems of such elongated screws are shown at 4'. The casing or lid 3 may conveniently be mounted on the base or frame 2 of such a machine through the intervention of a spacing frame 3' upon the top of the base 2 but it will be realized that this frame forms in effect a part of the casing 3.

In this particular application of the invention the casing may be formed with an upwardly extending flange 6 adapted to form a reasonably tight joint with the column or vertical housing 7 which is mounted on cross member 20 of base 2 and also formed with orifices 8 to permit the free up or down movement of the platform supporting or spacing means 4.

Figure 2:
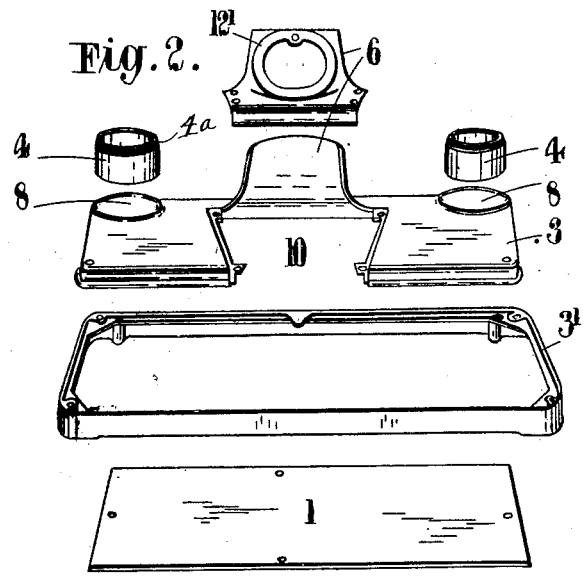
Fig. 2 is a view showing separately preferred means for converting an exposed scale into an enclosed one.

The casing 3, 3' is preferably adapted to be affixed to the scale by appropriate screws or the equivalent means after the latter has been assembled and with this end in view provision is made whereby it can be placed in position about the lower end of the vertical housing or column 7 despite the fact that the upper portion of the vertical housing for the indicating and differential counterbalancing mechanism, designated 9, is larger than the said lower end of the column. For example, as illustrated in the accompanying drawings, particularly Fig. 2, a slot 10 may be formed in one side of the casing 3 to permit the casing to be slid on sideways and a device 11 provided for covering over the slot once the casing 3 is in position. As shown in the drawings, see particularly Fig. 4, this device 11 has the upwardly extending flange portion 6 specially formed in order to accommodate a projecting flange 12 formed on the lower portion of the vertical housing. This flange 12 surrounds a circular opening formed in the column 7 to allow free access for adjusting the dash pot control of the oscillation of the scale pointer by means of a regulator nut 13, and a scroll ring 14 and instruction plate 15 are usually fitted to this flange 12 by means of a screw, about which when slackened they can be swung to expose the opening. Since adjustment of the dash pot control is necessary from time to time it is desirable to provide a similar flange 12' upon the upstanding flange 6 of the casing conveniently as shown upon the portion of the flange 6 that forms a part of the device 11; thus the scroll ring and instruction plate can be mounted on the casing instead of on the column 7 and permit ready access as desired. In this connection it may be noted that if demanded by weights and measures inspectors the screws or other means securing the casing to the base or frame and securing the various parts of the casing together may be sealed and in this case it is desirable to have independent access to the dash pot control adjustment.

As in the above mentioned patent by the same inventor, the scale mechanism comprises an equal armed lever 22 fulcrumed on base 2 at 24, an upwardly extending check arm 26 rigidly attached to each pan supporting element 5', and a pendulum 28 connected by a tape 30 to one of the check arms 26, whereby the indicator 32 is moved across chart 34 in accordance with the load on the scale pan. The scale pans 5 are carried by pivots 36 at the ends of lever 22. All this mechanism is well known in the art and needs no further description here.

It will be apparent that the invention is not limited to the particular means described and illustrated since it is evident that some of the parts shown may be dispensed with, for example, the bottom plate. Moreover as hereinbefore indicated the invention is not limited in its application to the particular kind of scales mentioned.

It will be understood that the invention permits an exposed scale to be converted readily into an enclosed one so that a demand for either type may be met readily.

I claim:

1. A scale of the even balance type having an exposed lever system, a pan adapted to be carried by each end of the lever system, a base for supporting said lever system, an indictator operated by the lever system and a vertical column having an enlarged upper portion and a reduced lower portion for enclosing said indicator, said column being centrally located relative to the lever system and mounted on the base, in combination with means for converting said scale into a scale having all the parts thereof except said pans completely enclosed and concealed, said converting means comprising a hollow casing having an upper face in a plane parallel to the plane of the base, means for attaching said casing to aforesaid base, said casing having a vertical centrally located upstanding neck of a size to fit the reduced portion of said indicator column, said upstanding neck being open at one side to permit the casing to be laterally moved onto the scale base for attachment thereto when the pans are removed, said neck after the casing has been attached to said base embracing and engaging the lower reduced portion of the indicator column, and a hollow coacting collar adapted to be attached to the neck after the casing has been assembled on the base for closing the open portion of the neck, said collar embracing and engaging the reduced portion of the indicator column left exposed by the first mentioned collar whereby said neck and collar coact to form part of the indicator column.

2. A scale such as described in claim 1, said upper face of the casing extending between the pans and the lever system and removable spacing sleeves carried by said lever system between the pans and the lever system to hold the pans above their normal vertical distance from the lever system whereby clearance is provided for the upper face of said casing between the pan and the lever system.

3. Means for enclosing a completely assembled even balance scale having an even balance lever for supporting platforms at each end and a base for carrying said lever system and an indicator column centrally carried by said base and having an enlarged upper portion, said enclosing means comprising a pan shaped casing the upper face of which is substantially parallel to said base, means for attaching said casing to the base, said casing having a cut away central portion for surrounding and engaging the lower end of the indicator column and a frame piece attachable to said casing for closing the cut away portion thereof, said frame piece coacting with said cut away casing portion whereby said frame piece and said cut away casing portion appear substantially as part of the indicator column.

In testimony whereof I hereto affix my signature.

JOSEPH HOPKINSON.